United States Patent
Fleischer, deceased

[15] 3,641,696
[45] Feb. 15, 1972

[54] INTERENGAGING ROLLER LINE GUIDE FOR FISHING RODS

[72] Inventor: Oscar Fleischer, deceased, 2610 S.W. 21st St., Miami, Fla. 33145 by Helen Krohn Fleischer, executrix

[22] Filed: Feb. 2, 1970

[21] Appl. No.: 7,581

[52] U.S. Cl. ............................43/24, 242/157 R, 254/190 R
[51] Int. Cl. .........................................................A01k 87/04
[58] Field of Search ..........................43/24; 242/157, 157.1; 254/190, 197

[56] References Cited

UNITED STATES PATENTS

| 521,704 | 6/1894 | Davis | 43/24 |
| 534,503 | 2/1895 | Fox | 254/190 X |
| 2,380,801 | 7/1945 | Stover | 254/190 X |
| 2,738,938 | 3/1956 | Benson et al. | 254/190 X |
| 801,884 | 10/1905 | Kunze et al. | 43/24 |
| 926,878 | 7/1909 | Kelley | 254/197 X |

Primary Examiner—Samuel Koren
Assistant Examiner—Daniel J. Leach
Attorney—Salvatore G. Militana

[57] ABSTRACT

A roller line guide for fishing rods and the like having a support adapted to be secured to a fishing rod and a pair of grooved rollers or sheaves having rim portions with the rollers rotatably mounted on the support one above the other and in engagement with each other. One roller has a peripheral flange about its rim portion for receiving the rim of the other roller whereby the fishing line received between the rollers cannot engage any stationary portion of the guide and the line cannot leave the confines of the pair of rollers. The engagement of the rollers also provides that the rollers rotate in unison when the fishing line engages either of the rollers.

2 Claims, 14 Drawing Figures

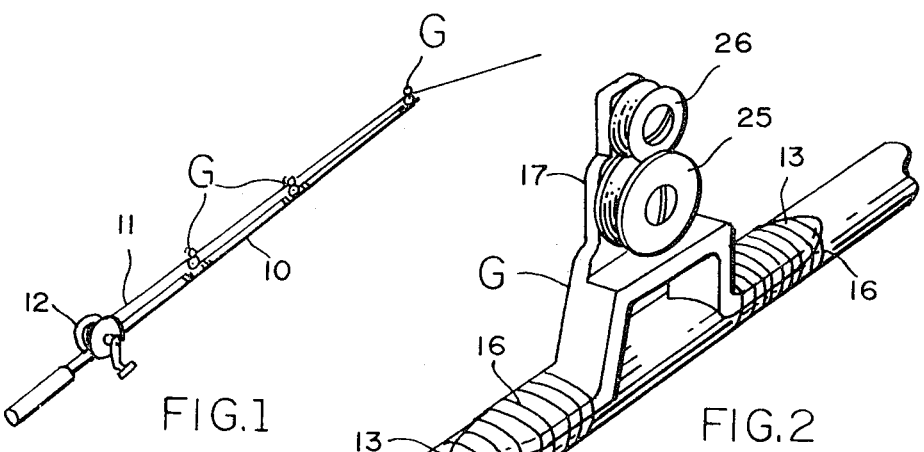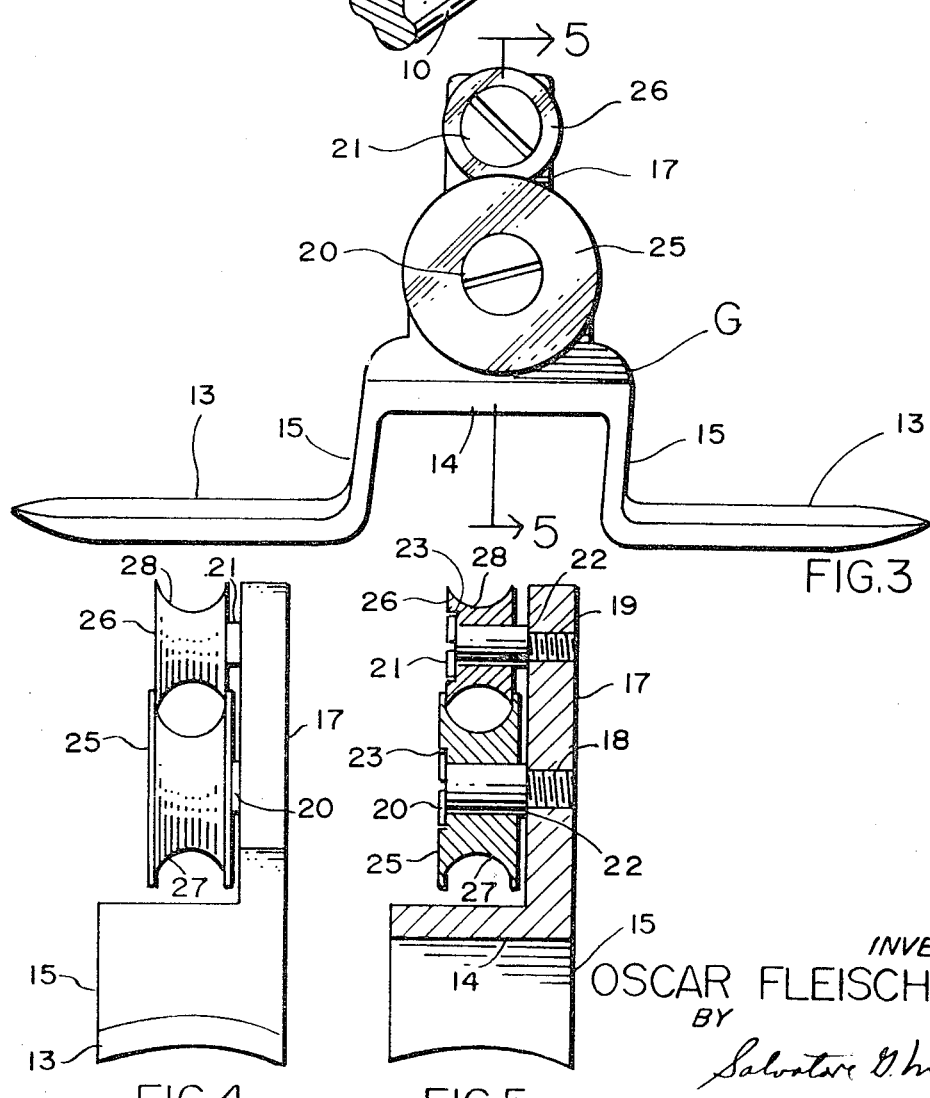

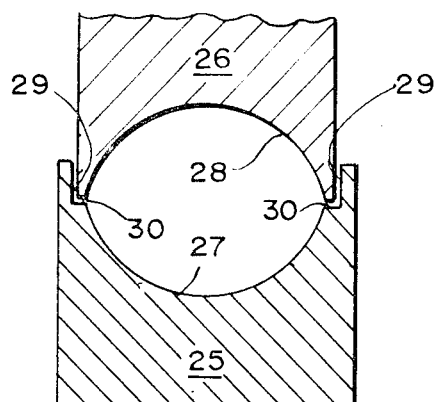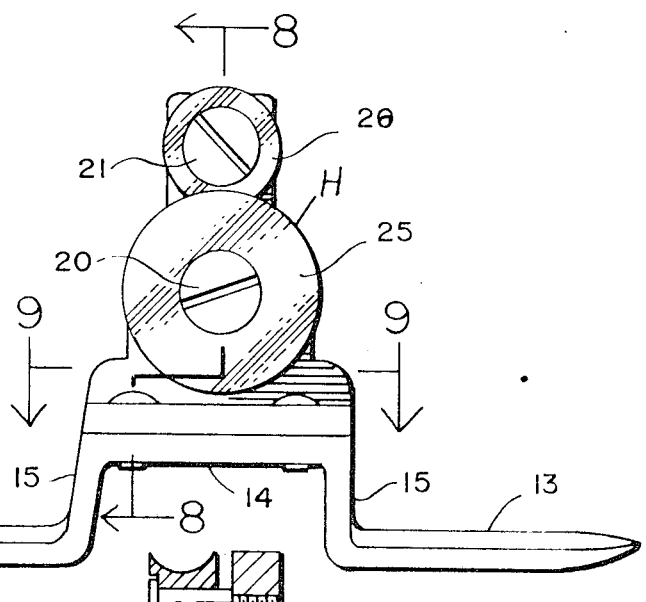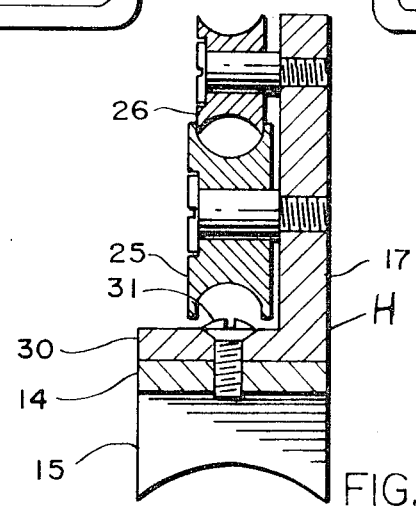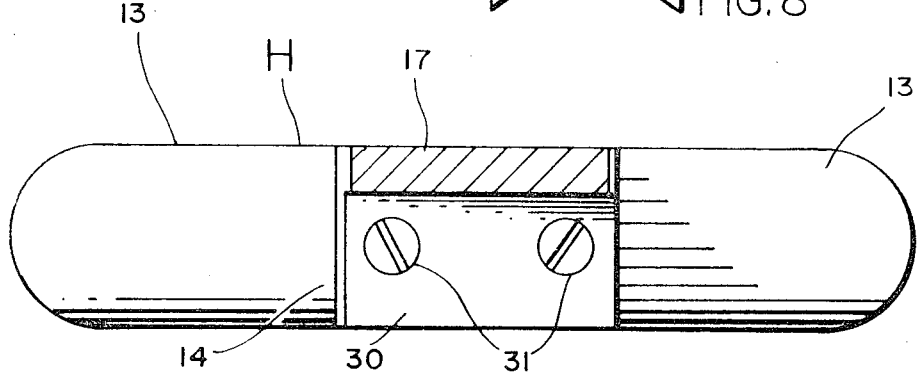

INVENTOR
OSCAR FLEISCHER
BY
*Salvatore G. Militana,*
ATTORNEY

INTERENGAGING ROLLER LINE GUIDE FOR FISHING RODS

This invention relates to fishing equipment and is more particularly directed to roller line guides and roller tip guides for fishing rods and the like.

At the present time fishing rods for fishing that are provided with roller line guides have either a single grooved roller mounted on each guide housing or a pair of grooved rollers that are mounted in a housing wherein the rollers are in spaced or separated positions. In both of these types of roller line guides, when the fishing line moves onto or off the reel, it will at some time or other rub against a stationary portion of the housing or the line will become disengaged from the roller. Also, the salt and other foreign substances of the sea water will collect in the housing and cause the freezing or locking of the rollers. In those instances where the rollers are mounted in a housing, a fisherman cannot visually note the failure of the rollers to rotate nor can they be reached within the housing to free the rollers when they become locked by salt and dirt accumulation therein. He can only remove the guide housing or dismantle it of all its parts. If he does not free the rollers, then the fishing line will effect and undesirable increased drag on the reel, and will itself wear and in due time become frayed and possibly break when a fish is being brought in.

The present invention contemplates avoiding the above-indicated undesirable features of roller line guides and has as its principal object the providing of a multiple interengaging roller line guide whose grooved rollers are completely exposed and one in which the line extending therethrough cannot engage any portion thereof that may be stationary.

Another object of the present invention is to provide a roller line guide for fishing rods having a pair of interengaging grooved rollers that rotate at all times and which will not permit the fishing line from leaving the confines of the rollers thereby reducing wear on the fishing line to a minimum.

A further object of the present invention is to provide a roller line guide for fishing rods which is simple in construction, most effective to guide the fishing line along the rod, wherein the fisherman can visually detect when the roller is not rotating and permits him access to the locked roller or rollers and to free them by use of his thumb or fingers.

A still further object of the present invention is to provide a roller line guide for fishing rods and the like having support means for a pair of interengaging rollers or sheaves, both of said rollers or sheaves being either of equal diameters or of different diameters, with one of said rollers or sheaves being slightly wider and flanged along both rim portions for receiving the rim portion of the slightly narrower roller or sheave whereby both rollers or sheaves will rotate at all times and a line received between said rollers or sheaves cannot get caught between the rims of said rollers or sheaves, nor can it leave the confines of said rollers or sheaves.

A still further object of the present invention is to provide a roller line guide described as above and constructed of two parts, a first part being secured to the rod and a second part being bolted to the first part, the second part mounting a part of interengaged grooved rollers whereby the second part may be readily removed in the event it is desired to replace the roller assembly without the necessity of removing the first part from the fishing rod.

With these and other objects in view, the invention will be best understood from a consideration of the following detailed description taken in connection with accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIG. 1 is a perspective view of a fishing rod showing my roller line guides mounted thereon.

FIG. 2 is an enlarged fragmentary perspective view of the fishing rod and a single roller line guide.

FIG. 3 is a side elevational view of the roller line guide.

FIG. 4 is an end elevational view.

FIG. 5 is a cross-sectional view taken along the line 5—5 of FIG. 3.

FIG. 6 is an enlarged fragmentary cross-sectional view showing the manner of engagement of the rollers.

FIG. 7 is a side elevational view of a roller line guide showing an alternate construction.

FIGS. 8 and 9 are cross-sectional views taken along the lines 8—8 and 9—9, respectively, of FIG. 7.

Figure 10:
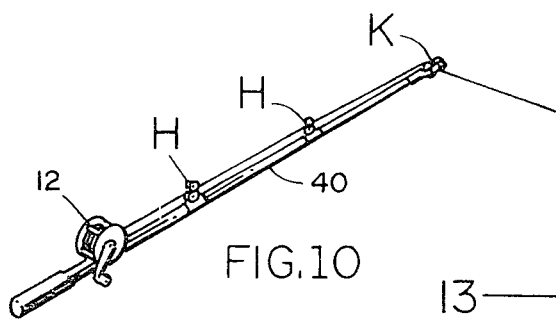

FIG. 10 is a perspective view of a further fishing rod having roller line guides and a roller tip line guide showing an alternate construction.

Figure 11:
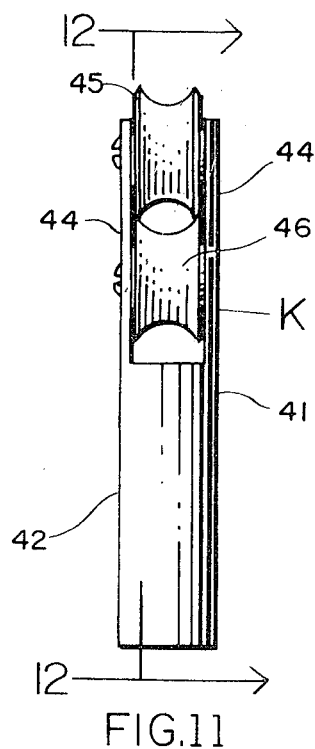

FIG. 11 is an elevational view of the roller tip line guide.

Figure 12:
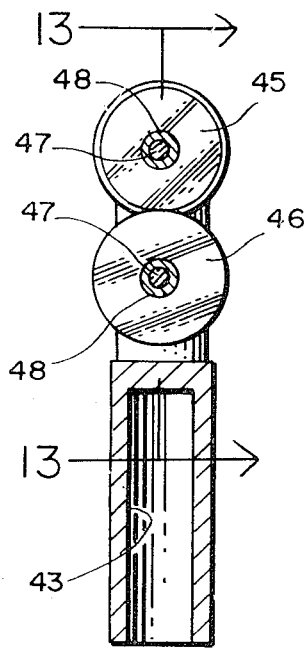

FIG. 12 is a cross-sectional view taken along the line 12—12 of FIG. 11.

Figure 13:
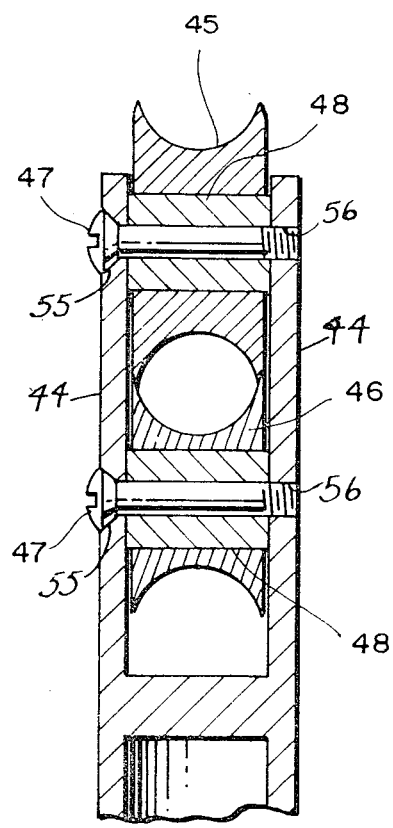

FIG. 13 is a cross-sectional view taken along the line 13—13 of FIG. 12.

Figure 14:
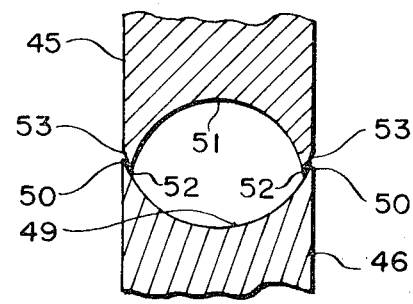

FIG. 14 is an enlarged fragmentary cross-sectional view showing the manner of engagement by the rollers.

Referring to the drawings wherein like numerals are used to designate similar parts throughout the several views, the numeral 10 refers to a fishing rod upon which my roller line guides G are mounted for guiding a fishing line 11 that extends from a fishing reel 12. Although the fishing reel 12 is shown to be of the casting type, a spinning reel or other types of reels may be used with the fishing rod 10 utilizing roller guides G.

Mounted in longitudinal alignment on spaced positions on the fishing rod 10 are my roller guides G having a generally U-shaped cross section and consisting of foot portion 13, a bridge portion 14 supported thereon by upright portions 15. The foot portions 13 that extend in opposite direction are curved on their lower surfaces so that they may lie evenly on the rod 10 and lashed thereto by windings 16.

The bridge portion 14 that is supported in spaced relation with the rod 10 is provided with a wall portion 17 extending upwardly of the bridge portion 14 along one side thereof. A second wall may be added to the opposite side of the wall 17 if additional support is desired. The wall portion 17 is provided with a pair of aligned threaded bores 18 and 19 that receive screwbolts 20 and 21 therein. The screwbolts 20 and 21 are provided with shoulders 22 which bear against the wall portion to permit the bolts 20 and 21 to be tightened in position on the wall portion 17 and prevent any possibility of being inadvertently unthreaded therefrom.

Rotatably mounted on the screwbolts 20 and 21 are rollers or sheaves 25 and 26 having arcuate grooves 27 and 28, respectively.

The rollers 25 and 26 are slotted on the outer surfaces as at 23 to receive the heads of the screwbolts 20 and 21 whereby the screwheads will become inset and coplanar with the outer surface of the rollers.

It is an important feature of the invention that the rollers 25 and 26 may be of equal or different diameters, the roller 25 must be slightly wider than the roller 26, and the two rollers are interengaged so that the arcuate grooves 27 and 28 of both rollers 25 and 26 form an enclosed opening for the fishing line so that the line cannot leave the confines of the rollers 25 and 26. To effect the interengagement of the rollers 25 and 26, roller 25 is flanged along both edges of the arcuate groove 27 to form sidewall portions 29, each joined by a ledge portion 30. The size of the roller 26 is such that the latter fits snugly between the sidewall portions 29 and engages the ledges 30 to form an oval-shaped opening for receiving the fishing line 11 between the arcuate grooves 27 and 28. Note that the two rollers 25 and 26 form an unbroken oval contour which is closed at the points of contact of the pairs of rims of the rollers.

From the above description taken in connection with the accompanying drawings, the fishing line 11 extending between the rollers 25 and 26 upon sliding therethrough will cause the rollers to rotate when contact is made by the moving fishing line in engaging either of the rollers 25 and 26. At no time can the fishing line 11 during its movement when being unwound off the reel or when being rewound on the reel be in contact with any surface that is immobile so as to cause drag on the reel or wear on the fishing line. Consequently, the wear and rubbing effected on the fishing line will be negligible if not at a minimum at all times, while the fishing rod 10 is in use. Also, since the rollers 25 and 26 interengage at their rim portions in the manner described as above, the fishing line cannot become entangled nor can it leave the confines of the two rollers 25 and 26. Due to the fact that salt, dirt and grime will be lodged in and around the rollers 25 and 26 and the screwbolts 20 and 21, it is important that the fisherman be able to check the rollers 25 and 26 to see that they are rotating as the fishing line passes therethrough. In using my roller line guides G, a fisherman can visually check whether or not the roller line guides G are rotating as the fishing line moves therealong, and if they are not rotating, all he need do is rotate them manually with his thumb or finger to release the rollers of the dirt or salt particles impeding their rotative movement. Should the rollers require maintenance, the screwbolts 20 and 21 can be readily removed from the support 17 and the rollers 25 and 26 removed from the screwbolts 20 and 21 so that the various parts be properly readily and simply dismantled for cleansing and oiling and then returned to their original position on the support 17.

As stated hereinabove, my roller line guides G may be used on casting rods as well as spinning fishing rods. Also, these roller guides G may be used as a tip guide. In the instance in its use as a tip roller guide, the leading foot portion 13 can be removed completely or only in part so that the rollers 25 and 26 can be positioned at the extreme tip of the fishing rod 10.

Referring now to FIGS. 7–9 inclusive, an alternate construction of my roller line guide H is shown. This modification is identical in construction with the previously described roller line guide G except that the former is constructed in two parts, which are fastened together. The two parts of the roller line guide H consists of a lower part made up of the supporting structure, namely, foot members 13, and bridge portion 14, and upright members 15, 15. The upper part consists of the wall 17 from which a flange foot portion 30 extends. The flange portion 30 is fastened to the bridge portion 14 by screwbolts 31 that extend through bores in the flange portion 30 and bridge portion 14. The rollers 25 and 26 are rotatably secured to the wall 17 in the same manner in both of my original and alternate constructions.

The purpose of constructing my alternate structure as shown by FIGS. 7–9, inclusive, in two parts, permits the user to remove the upper structure containing the rollers 25 and 26 readily without having to remove the lower structure. The lower structure is normally fastened to the fishing rod by windings of line or cord which are then coated with water proofing material such as shellac or varnish to protect same from the elements and sea water. Besides having to remove the roller structure 17, 25, 26 for the purpose of cleaning and repairing the rollers 25 and 26, it may be necessary to remove them for the purpose of using a pair of different sized rollers when the fisherman changes from one kind of fishing to another wherein a different sized fishing line is being used.

Referring now to FIGS. 10 to 14 inclusive, a fishing rod 40 is provided with the fishing reel 12 and roller line guides H described hereinabove with a roller tip guide K mounted on the tip of the fishing rod 40. The roller tip guide K consists of a cylindrical support member 42 having a hollow portion 43 for receiving the extreme tip of the fishing rod 40 which is normally cemented therein. The support member 42 is provided with opposed wall portions 44 extending upwardly thereof in spaced relation with each other. Both rollers 45 and 46 are of identical widths and are rotatably mounted on bushings 48 that extend between the wall portions 44. These rollers 45 and 46 may be of equal or different diameters. Pivot pins 47 extend through bores 55 formed on one wall portion 44 and are threaded into threaded bores 56 formed on the other wall portion 44 to rotatably support the rollers 45 and 46.

The roller 46 is provided with an arcuate peripheral groove 49 forming rim portions 50 in coplanar relation with the sidewalls of the roller 46. The roller 45 is provided with an arcuate peripheral groove 51 which in combination with tapered sidewall portions 53 form rim portions 52 that extend within the confines of the rim portions 50 of the roller 46. The tapered portions 53 of the roller 45 engage the outer edges of the arcuate groove 49 whereby the rollers 45 and 46 will tend to rotate together and also prevent the fishing line that extends between the arcuate grooves 49 and 51 from leaving the confines of these grooves. As occurs in my previously explained interengaging roller guides G and H, the fishing line extending between the rollers 45 and 46 cannot impinge on a nonrotating member when being reeled on or unwound off the fishing reel 12, but will instead engage either of the arcuate grooves 49 and 51 of rotatable rollers 45 and 46, respectively.

Having disclosed my invention, what I claim as new and desire to secure by Letters Patent is:

1. A roller line guide for fishing rods and the like comprising a substantially U-shaped member having foot portions adapted to be secured to a fishing rod, a substantially elongated member extending upwardly of said U-shaped member, said elongated member having a pair of substantially aligned threaded bores, a pair of grooved rollers having rim portions, screwbolts received by said threaded bores and rotatably mounting said grooved rollers, said screwbolts each having shoulder means engaging said elongated member, one of said rollers being substantially narrower in width than the other of said rollers, said other roller having a peripheral flange about its rim portion, said peripheral flange receiving the rim portion of said narrower roller adapted to rotate said grooved rollers in unison.

2. The structure as recited by amended claim 1 wherein said elongated member has a flange portion, and fastening means detachably securing said flange portion to said U-shaped member.

* * * * *